(12) United States Patent
Van Hemelryck et al.

(10) Patent No.: US 9,017,473 B2
(45) Date of Patent: Apr. 28, 2015

(54) NEUTRALIZING AGENT FOR PAINTS

(75) Inventors: Bruno Van Hemelryck, Chaponost (FR); Manuel Hidalgo, Brignais (FR)

(73) Assignee: Arkema France, Colombes (FR)

( * ) Notice: Subject to any disclaimer, the term of this patent is extended or adjusted under 35 U.S.C. 154(b) by 242 days.

(21) Appl. No.: 13/121,307

(22) PCT Filed: Sep. 25, 2009

(86) PCT No.: PCT/FR2009/051818
§ 371 (c)(1),
(2), (4) Date: Mar. 28, 2011

(87) PCT Pub. No.: WO2010/037953
PCT Pub. Date: Apr. 8, 2010

(65) Prior Publication Data
US 2011/0179973 A1 Jul. 28, 2011

(30) Foreign Application Priority Data
Sep. 30, 2008 (FR) ..................... 08 56623

(51) Int. Cl.
| | |
|---|---|
| *C09D 7/12* | (2006.01) |
| *C09D 5/16* | (2006.01) |
| *C08K 5/3467* | (2006.01) |
| *C07D 233/36* | (2006.01) |
| *C09D 5/02* | (2006.01) |
| *C09D 17/00* | (2006.01) |
| *C08K 5/17* | (2006.01) |
| *C08K 5/34* | (2006.01) |

(52) U.S. Cl.
CPC ............. *C09D 7/1233* (2013.01); *C08K 5/17* (2013.01); *C08K 5/34* (2013.01); *C09D 17/003* (2013.01)

(58) Field of Classification Search
None
See application file for complete search history.

(56) References Cited

U.S. PATENT DOCUMENTS

| | | | | |
|---|---|---|---|---|
| 4,487,941 | A * | 12/1984 | Sekmakas et al. | 548/324.5 |
| 4,703,080 | A * | 10/1987 | Shay et al. | 524/555 |
| 5,496,907 | A * | 3/1996 | Dochniak | 528/73 |
| 5,646,198 | A * | 7/1997 | Tanaka et al. | 523/122 |
| 6,287,377 | B1 * | 9/2001 | Binns et al. | 106/499 |
| 6,538,143 | B1 | 3/2003 | Pinschmidt, Jr. et al. | |
| 6,649,691 | B2 | 11/2003 | Pinschmidt, Jr. et al. | |

FOREIGN PATENT DOCUMENTS

| | | | | |
|---|---|---|---|---|
| EP | 0928820 | * | 7/1999 | ............... C09D 7/12 |
| EP | 1167356 | | 1/2002 | |

* cited by examiner

Primary Examiner — Yun Qian
(74) Attorney, Agent, or Firm — RatnerPrestia

(57) ABSTRACT

The invention relates to a method of neutralizing paints, that includes adding at least one associative neutralizing agent to a formulation such as a pigment concentrate, a white paint base or paint. The associative neutralizing agent includes at least one neutralizing group N and at least one nitrogenous associative group A bonded together by at least one "spacer" group Sp. The invention also relates to pigment concentrates and to paints containing at least one such associative neutralizing agent.

8 Claims, No Drawings

NEUTRALIZING AGENT FOR PAINTS

CROSS-REFERENCE TO RELATED APPLICATIONS

This application is a national stage application under 35 U.S.C. §371 of PCT/FR2009/051818, filed Sep. 25, 2009, which claims benefit to French application FR 08.56623, filed on Sep. 30, 2008 all of which are hereby incorporated by reference.

FIELD OF INVENTION

The present invention relates to paints, whether they are aqueous or solvent-based paints.

BACKGROUND OF THE INVENTION

In aqueous paints, such as paints that use acrylic-based latices, a pH adjustment is generally necessary in order to stabilize the latex. This adjustment is called neutralization. Furthermore, when a pigment concentrate is diluted in a white paint or white base, whether it is aqueous or solvent-based, it is also necessary to neutralize (that is to say to adjust the pH of) these pigment concentrates.

Typically, the pH of a latex is ideally adjusted to a value between 8 and 10, preferably between 8.5 and 9.5. This adjustment is preferably carried out using neutralizing amines (adjusting amines) added in an amount of 0.1 to 0.5% by weight relative to the weight of the paint to be neutralized. In pigment concentrates, the amount of neutralizer is, preferably, kept below 3.5% by weight.

The first neutralizers used were, for example, ammonium hydroxide or alkali metal hydroxides, especially sodium hydroxide.

Today, for reasons of volatility of the neutralizer or of water uptake by the paint films obtained, it is preferred to use other neutralizers, especially amines, and in particular 2-amino-2-methyl-1-propanol (CAS No. 124-68-5), sold under the brand AMP® at 90 or 95% in water under the names AMP® 90 and AMP® 95 respectively by Angus.

2-Amino-2-methyl-1-propanol thus has a good neutralizing action. However, pigment concentrates, latices and more generally paints neutralized with this product may exhibit instabilities during storage, with, in certain cases, the appearance of syneresis (phase separation with a liquid exudate at the surface), requiring a mechanical rehomogenization before use.

Moreover, it has been observed that paint films, especially those comprising latices and pigment concentrates neutralized with AMP®, are sensitive to humid atmospheres, and the films often display blistering phenomena under these conditions, which often makes the second application of a coat of paint difficult.

Furthermore, with a boiling point of around 165° C., this aminoalcohol is today considered to be a volatile organic compound, with regard to current legislation, especially in Europe.

Indeed, the regulations in force today impose the use, in paints, latices and generally in any type of curable film-forming coating, of compounds referred to as "non-VOC" compounds, that is to say that do not comprise or comprise very few volatile organic compounds.

However, the non-VOC neutralizers which are studied today have not proved very suitable for the specifications of paints. Thus, for example, the persistence of these neutralizers in the films often causes an unacceptable plasticization of the paints.

This is why it is necessary to research alternatives to the neutralizing agents used today, which make it possible to overcome the drawbacks mentioned above, while meeting the requirements of current regulations.

Thus, a first objective of the invention is to propose a neutralizing agent, especially for aqueous or solvent-based paints or for pigment concentrates for the preparation of said paints.

Another objective of the present invention is to propose a non-VOC neutralizing agent, especially for aqueous or solvent-based paints or for pigment concentrates for the preparation of said paints.

According to yet another objective, the present invention proposes a non-VOC neutralizing agent that enables good storage stability of aqueous or solvent-based paints or pigment concentrates.

Other objectives will appear in the description of the invention which follows.

These objectives are partly or completely achieved owing to the research work carried out by the applicant company.

SUMMARY OF INVENTION

Thus, one subject of the present invention is firstly the use, as a neutralizing agent in a paint formulation, of at least one compound comprising at least one neutralizing group N and at least one nitrogen-containing associative group A, connected to one another by at least, and preferably, one "spacer" group Sp.

DETAILED DESCRIPTION OF CERTAIN EMBODIMENTS OF THE INVENTION

Thus, the neutralizing agents according to the invention will be referred to as "associative neutralizing agents" or more simply "associative neutralizers" in the remainder of the present document.

The expression "formulation for paint" encompasses any type of formulation for paint, wood stain, varnish, pigment concentrate, white paint base, and generally any type of formulation capable of being incorporated in the manufacture of an aqueous or solvent-based coating, and requiring to be neutralized, more precisely the pH of which needs to be increased to the values indicated previously.

In the associative neutralizing agents of the present invention, the neutralizing group may be of any type known per se, and preferably a primary, secondary or tertiary amine group. This group has the role of neutralizing the possible acid functions encountered in the aqueous or solvent-based, preferably aqueous, paint formulations. As indicated above, the term "neutralize" is understood to mean the adjustment of the pH to a value generally greater than 8, preferably between 8 and 10, preferably between 8.5 and 9.5.

According to one aspect of the invention, the neutralizing group is represented by $-NH_2$, $-NHR^1$ or $-NR^1R^2$, where $R^1$ and $R^2$, which are identical or different, represent, independently of one another, a linear, branched or cyclic alkyl radical having from 1 to 10, preferably from 1 to 6, carbon atoms, optionally substituted with one or more substituents chosen from hydroxyl ($-OH$) and thiol ($-SH$) groups. Very preferably, the neutralizing group of the associative neutralizer according to the invention is the $-NH_2$ group, or an $-NHR^1$ group, where $R^1$ is as defined previously.

The "spacer" group makes it possible to connect at least one neutralizing group and/or at least one associative group, and thus may be of any type known per se. However, the "spacer" group must not interfere, or only interfere very little, with the neutralizing and associative groups of the compound.

Said "spacer" group is therefore considered to be an inert group with respect to the neutralizing group and to the "spacer" group. The expression ""spacer" that is inert with respect to the neutralizing group" is understood to mean that it does not have acid functions capable of reacting with the neutralizing group by protonating it. The expression ""spacer" that is inert with respect to the associative group" is understood to mean that it does not comprise associative functions as defined according to the invention.

The "spacer" group is preferably a linear, branched or cyclic hydrocarbon chain which may contain one or more aromatic radicals, and/or one or more heteroatoms. Said chain may optionally be substituted, as long as the substituents are inert with respect to the neutralizing and associative groups.

According to one preferred embodiment, the "spacer" group is a linear or branched alkyl chain having from 1 to 6 carbon atoms.

The expression "associative group" present in the associative neutralizing agent according to the invention is understood to mean a nitrogen-containing group capable of associating with another by means of non-permanent physical interactions such as ionic interactions, hydrogen bonds, ion-dipole or dipole-dipole interactions.

According to one preferred aspect of the present invention, the nitrogen-containing associative group is a group capable of forming one or more hydrogen bond(s). Very preferably, the associative group comprises at least one —C(Z)—N— linkage, more preferably at least one —N—C(Z)—N— linkage, and/or at least one —N═CH—N— linkage, included in a chain or a ring, where Z represents oxygen, sulfur or an ═NH group. The —N—C(Z)—N— linkages, where Z represents oxygen are preferred.

Among the associative groups comprising at least one —C(Z)—N— linkage, mention may be made, by way of non-limiting examples, of the following optionally substituted groups: urea, bisurea, amide, amidopyridine, ureidopyrimidinone, urazole, triazolidinedione, uracil, and imidazolidone.

Other associative groups which may be included in the associative neutralizer used in the present invention are those comprising cyclic imines (—C═N—), such as triazolines, and more generally comprising the units (A1) and (A2) below:

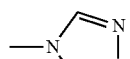
(A1)

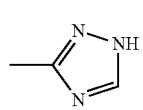
(A2)

In another preferred embodiment, the associative group comprises at least one nitrogen-containing heterocycle, generally having 5 or 6 ring members, comprising 1, 2, 3 or 4 nitrogen atoms in the ring, preferably two nitrogen atoms in the ring. Examples of associative groups according to this preferred embodiment of the invention are imidazolidinyl, triazolyl, triazinyl, bisureyl and ureidopyrimidyl groups. The imidazolidinyl group is preferred.

According to yet another preferred embodiment, the associative group that can be used within the context of the present invention comprises at least one unit (A3) to (A7) below:

(A3)

(A4)

(A5)

(A6)

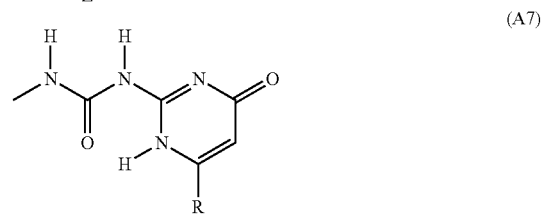
(A7)

where R represents a substituent, for example a linear or branched alkyl radical having from 1 to 10 carbon atoms and Z is as defined previously and represents an oxygen or sulfur atom or an ═NH group, preferably an oxygen atom.

According to one preferred embodiment of the invention, the associative neutralizer has one, preferably two, and more preferably all of the following features:
- $pK_a$ (dissociation constant of the protonated amine measured at 25° C.) greater than or equal to 8.5, preferably greater than or equal to 9, not exceeding 12, preferably not exceeding 11;
- soluble in proportions ranging from 10 g to 1000 g of amine, preferably from 10 g to 500 g of amine, more preferably from 10 g to 100 g of amine, per 100 g of polar solvent, preferably water and/or alcohols;
- boiling point above 250° C., preferably above 300° C., more preferably above 320° C., at atmospheric pressure.

The associative neutralizing agents comprising one neutralizing group, one "spacer" group and one associative group may, for example, be represented by the formula (1a) below:

$$N\text{-}Sp\text{-}A \quad (1a).$$

The associative neutralizing agents comprising one neutralizing group, one "spacer" group and two associative groups may, for example, be represented by the formula (1b) below:

(1b)

Similarly, the associative neutralizing agents comprising two neutralizing groups, one "spacer" group and one associative group may, for example, be represented by the formula (1c) below:

(1c)

According to the same principle, the associative neutralizing agents comprising two neutralizing groups, one "spacer" group and two associative groups may, for example, be represented by the formula (1d) below:

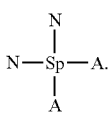
(1d)

Other associative neutralizing agents according to the invention may also be represented by the formulae (1e) to (1l) below:

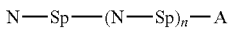
(1e)

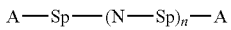
(1f)

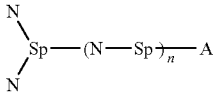
(1g)

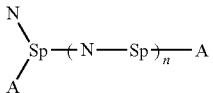
(1h)

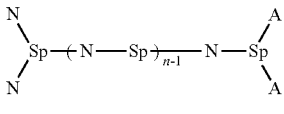
(1i)

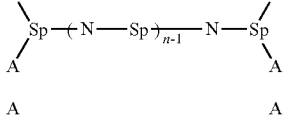
(1j)

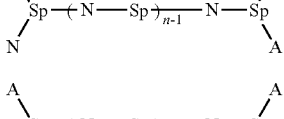
(1k)

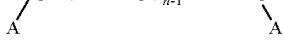
(1l)

where n represents 1, 2 or 3.

It should be understood that, in the associative neutralizing agents, and especially those of formulae (1a) to (1l), if more than one neutralizing group is present, they may be identical or different. Similarly, if more than one associative group is present, they may be identical or different. Finally, if more than one "spacer" group is present, they may be identical or different.

Generally, and non-limitingly, the associative neutralizing agents of the invention preferably comprise at most 4 neutralizing groups and/or at most 4 associative groups. There are 1, 2 or 3, preferably 1, "spacer" groups.

According to one preferred embodiment of the invention, the associative neutralizing agent corresponds to the formula (1a) set out above.

Preferred examples of associative neutralizing agents are those comprising:
- a neutralizing group, preferably a primary, secondary or tertiary amine, preferably a primary amine,
- a spacer group, preferably a hydrocarbon chain having from 1 to 6 carbon atoms, preferably from 2 to 4 carbon atoms, and
- an associative group of formulae (A1) to (A7) defined above.

Thus, non-limiting examples of associative neutralizing agents of use within the context of the present invention are 1-(2-aminoethyl)imidazolidin-2-one (UDETA), 1-(2-[(2-aminoethyl)amino]ethyl)-imidazolidone (UTETA), 1-(2-{2-[(2-aminoethylamino]-ethyl}amino)ethyl)imidazolidone (UTEPA), N-(6-amino-hexyl)-N'-(6-methyl-4-oxo-1,4-dihydropyrimidin-2-yl)urea (UPy), 3-amino-1,2,4-triazole (3-ATA) and 4-amino-1,2,4-triazole (4-ATA) and mixtures thereof. UDETA is preferred for use in the present invention.

The associative neutralizing agents are either commercially available, or known, or else obtained according to synthesis processes known to a person skilled in the art, directly or by simple adaptations, and which are described in the scientific literature, the patent literature, Chemical Abstracts, or by online databases or else the Internet.

By way of example, UDETA, UTETA and UTEPA may be prepared by reacting urea with diethylenetriamine (DETA), triethylenetriamine (TETA) and tetraethylene-pentamine (TEPA) respectively.

One associative neutralizer that is very particularly preferred for the use that is the subject of the present invention is UDETA.

Indeed, UDETA is a non-VOC amine (boiling point >300° C.), that is highly soluble in water and also in numerous organic solvents such as alcohols and polyols, which may advantageously be used in formulations for paints, especially aqueous paints, as a pH adjuster as a replacement for conventional neutralizing agents such as the amines or alkanolamines customarily used.

It has surprisingly been discovered that the associative neutralizers according to the invention give the various formulations neutralized (pigment concentrates, white bases, paints and other coatings, for example wood stains) rheological properties that are quite advantageous, especially as regards viscosity: it has been observed that the associative neutralizers used in the invention make it possible to increase the viscosity of the formulations.

Thus, and according to another aspect of the invention, the associative neutralizers of the invention may also advantageously be used, not only as neutralizers, but also as co-thickeners, or even thickeners.

The stability over time conferred on the formulations for paints neutralized by an associative neutralizing agent according to the invention, especially UDETA, is greater than that provided, for example, by amino-2-methyl-1-propanol (AMP® from Angus) considered today as one of the best neutralizing agents for aqueous acrylic paints, but classified as a VOC.

This stability performance was observed after 7 months, when it was possible to observe a stable pH, a good stability of the dispersion of the pigment ($TiO_2$) and of the calcium carbonate opacifying filler, via the absence of syneresis, a small change in the viscosity (after stirring). The addition of an associative neutralizer according to the invention to an aqueous satin-finish paint formulation has also provided a much lower sensitivity to water of the dried film relative to the same formulation neutralized by AMP®.

Moreover, the associative component of the neutralizing agents used in the present invention provides a quite advantageous performance in terms of rheological reinforcement which is expressed by a higher viscosity than with AMP®. A direct consequence thereof is the possible decrease in the amount of thickening agent customarily added to the paint formulation, and also a better applicability to all types of supports and in particular a better vertical applicability and a better applicability to metallic supports, performances that are very sought after for industrial paints.

Furthermore, the non-VOC associative neutralizer of the present invention does not lead to plasticization of the paint film in which it was used. This has especially been demonstrated by an absence of a tacky appearance or a weak tacky effect of a dried film, perfectly comparable with those observed with films obtained from paints neutralized with conventionally used neutralizers. This limited plasticization can also be evaluated by a hardness test of the dried film. A dried film of satin-finish paint has the same hardness at 20° C. when the neutralizer is an associative neutralizer according to the invention compared to conventional neutralizing amines.

It has surprisingly been discovered that the associative neutralizers according to the invention give the various formulations neutralized (pigment concentrates, white bases, paints, especially for inks and varnishes and other formulations requiring the dispersion of fillers or pigments in a matrix) co-dispersant properties: it has been observed that the associative neutralizers used in the invention make it possible to increase the dispersion of fillers or of pigments when they are used in combination with amphiphilic polymers.

Thus, and according to another aspect of the invention, the associative neutralizers of the invention may also advantageously be used as co-dispersants.

The dispersants used in combination with the associative neutralizers of the invention are preferably amphiphilic polymers which may be polymers or copolymers resulting from the radical polymerization of hydrophobic and hydrophilic unsaturated ethylenic monomers such as styrene and derivatives thereof, acrylic acid and esters and amides thereof, methacrylic acid and esters and amides thereof, and including, at least, a portion of acid groups that can be neutralized by the associative neutralizing agent of the invention. These amphiphilic polymers may be prepared by conventional or controlled radical polymerization techniques.

The associative neutralizers used within the context of the present invention may also be used with other neutralizers commonly used in the field. In addition, mixtures, in all proportions, of two or more associative neutralizers according to the invention may be used in one and the same paint formulation.

As indicated previously, the present invention relates to the use, as a neutralizing agent in a paint formulation, of at least one associative neutralizer as defined above.

The paint formulation may be used in a manner known to the person skilled in the art for the manufacture of aqueous paint, such as an acrylic-based latex paint, said acrylic base possibly being, for example, a styrene-acrylic latex, a vinyl-acrylic latex or a completely acrylic latex, or else a solvent-based paint, such as an alkyd or glycerophthalic paint.

Thus, another aspect of the present invention relates to a formulation for paint, especially for aqueous or solvent-based paint and/or pigment concentrate, comprising at least one associative neutralizer, as defined previously, as a neutralizing agent.

The colored or non-colored aqueous or solvent-based paints according to the present invention find a very particularly advantageous use as products for coating surfaces, walls and other architectural surfaces, whether they be interior or exterior.

Advantageously, the paint formulation according to the invention contains from 0.05 to 5% by weight, preferably from 0.05 to 2% by weight, more preferably from 0.1 to 0.5% by weight, and more preferably still from 0.1 to 0.3% by weight of at least one associative neutralizer relative to the total weight of the formulation.

The associative neutralizer(s) may be the only neutralizing agent(s) of the paint formulation or else the paint may comprise at least one other neutralizing agent chosen from those commonly used by and known to a person skilled in the art, and especially from aqueous ammonia, sodium hydroxide, dimethylamine, monoethanol-amine, diethanolamine, N-methylethanolamine, 2-amino-2-methyl-1-propanol, sec-butylaminoethanol and 2-n-butyl-aminoethanol.

Preferably, the associative neutralizer(s) represent(s) at least 1% of the mixture of neutralizing agents, more preferably still at least 50% by weight of the mixture of neutralizing agents.

Another subject of the present invention is a colored paint, characterized by the fact that it has been obtained by diluting a pigment concentrate (PC1) comprising, per 100 parts by weight:
  from 1 to 4 parts by weight of at least one associative neutralizer as defined above;
  from 1 to 4 parts by weight of at least one dispersant;
  from 0 to 4 parts by weight of at least one thickener;
  from 20 to 50 parts by weight of at least one pigment or dye;
  from 40 to 70 parts by weight of water;
  from 1 to 10 parts by weight of a drying retarder, such as polyethylene glycol 200; and
  from 0.1 to 0.8 part by weight of customary additives and adjuvants, such as antifoaming agents and biocides;
in an aqueous white matt paint base (MP1) comprising, per 1000 parts by weight:
  from 80 to 150 parts by weight of added water;
  from 1 to 2 parts by weight of at least one dispersant;
  from 1 to 3 parts by weight of at least one neutralizing agent, such as, but not necessarily, an associative neutralizer as defined above;
  from 80 to 150 parts by weight of white pigment, for example titanium dioxide ($TiO_2$):
  from 400 to 550 parts by weight of at least one other white pigment;
  from 100 to 200 parts by weight of at least one binder such as an acrylic emulsion or an acrylic resin;
  from 150 to 250 parts by weight of at least one thickener such as a cellulose ether; and
  from 2 to 5 parts by weight of customary additives and adjuvants, such as antifoaming agents, coalescing agents and biocides.

According to another aspect, an additional subject of the present invention is a colored paint, characterized by the fact that it has been obtained by diluting the pigment concentrate (PC1) defined above in an aqueous white satin-finish paint (SP1) comprising, per 1000 parts by weight:
- from 70 to 150 parts by weight of added water;
- from 1 to 3 parts by weight of at least one dispersant;
- from 1 to 3 parts by weight of at least one neutralizing agent, such as but not necessarily, an associative neutralizer as defined above;
- from 80 to 300 parts by weight of white pigment, for example titanium dioxide ($TiO_2$);
- from 40 to 90 parts by weight of at least one other white pigment;
- from 400 to 550 parts by weight of at least one binder such as an acrylic emulsion or an acrylic resin;
- from 1 to 20 parts by weight of at least one thickener; and
- from 10 to 40 parts by weight of customary additives and adjuvants, such as antifoaming agents, coalescing agents and biocides.

According to yet another aspect, an additional subject of the present invention is a colored paint, characterized by the fact that it has been obtained by diluting the pigment concentrate (PC1) defined above in an aqueous white exterior wall paint (EWP1) comprising, per 1000 parts by weight:
- from 80 to 150 parts by weight of added water;
- from 200 to 250 parts by weight of at least one binder such as an acrylic resin;
- from 1 to 3 parts by weight of at least one dispersant;
- from 1 to 3 parts by weight of at least one neutralizing agent, such as, but not necessarily, an associative neutralizer as defined previously;
- from 160 to 250 parts by weight of white pigment, for example titanium dioxide ($TiO_2$);
- from 300 to 400 parts by weight of at least one other white pigment;
- from 120 to 200 parts by weight of at least one thickener such as a cellulose ether; and
- from 2 to 5 parts by weight of customary additives and adjuvants, such as antifoaming agents and biocides.

According to yet another aspect, an additional subject of the present invention is a colored paint, characterized by the fact that it has been obtained by diluting the pigment concentrate (PC1) defined above in a white solvent-based paint base ($P_{solv}$), comprising, per 1000 parts by weight:
- from 500 to 650 parts by weight of an alkyd resin;
- from 230 to 350 parts by weight of at least one white pigment;
- from 4 to 8 parts by weight of at least one wetting agent;
- from 15 to 25 parts by weight of at least one drying agent;
- from 6 to 10 parts by weight of customary additives and adjuvants, such as antisettling agents and antiskinning agents; and
- from 80 to 120 parts by weight of a hydrocarbon solvent, such as for example white spirit.

In each of the paints described above, the pigment concentrate generally represents between 0.1 and 8% by weight of the resulting paint.

Another subject of the present invention is a pigment concentrate comprising at least one associative neutralizing agent as defined above. The pigment concentrate of the invention moreover generally comprises a primary dispersant, one or more pigments, water and one or more customary additives and adjuvants.

The pigment concentrate of the invention may advantageously be intended for coloring an aqueous or solvent-based white paint base.

The pigment concentrate may also comprise one or more other neutralizing agents, especially chosen from those commonly used by and known to a person skilled in the art, and especially those chosen from aqueous ammonia, sodium hydroxide, dimethylamine, monoethanolamine, diethanolamine, N-methylethanolamine, 2-amino-2-methyl-1-propanol, sec-butylaminoethanol and 2-n-butylaminoethanol.

Said pigment concentrate may advantageously comprise from 0.05 to 10% by weight of at least one associative neutralizer and, when it (they) is (are) used in a mixture with at least one other neutralizing agent, it (they) advantageously represent(s) at least 1% by weight, preferably at least 50% by weight of said mixture (all of the neutralizing agents).

The various formulations for paints, white bases, pigment concentrates and others, mentioned previously, may contain, besides at least one associative neutralizer according to the invention, one or more universal dispersants such as hydrophilic modified PU oligomers (e.g. Borchi® Gen 0451, Borchi® Gen SN 95).

It has quite surprisingly been observed that the associative neutralizer used to neutralize a pigment concentrate, an aqueous or solvent-based paint, and more generally any coating formulation that has to be neutralized, also behaves as a rheology modifier: indeed, the associative neutralizer has co-thickener or even thickener properties, but also co-thixotropic agent or even thixotropic agent properties.

The following examples illustrate the present invention without however limiting the scope thereof. In these examples, the parts and the percentages are by weight, unless otherwise indicated.

Example 1

Pigment Concentrates, of type PC1

TABLE 1

| | PIGMENT CONCENTRATE | |
|---|---|---|
| Component | PCu Quantity (g) | PCam Quantity (g) |
| Coadix ® 123K (primary dispersant) (Coatex) | 2.1 | 2.1 |
| UDETA (associative neutralizer) | 2.1 | — |
| AMP ® 95 (neutralizer) | — | 2.1 |
| Irgalite ® Blue PG (pigment) (B.A.S.F.) | 27.98 | 27.98 |
| BYK 038 (antifoaming agent) (Byk Chemie) | 0.35 | 0.35 |
| Acticide MBS (biocide) (Thor) | 0.07 | 0.07 |
| Water | 62.97 | 62.97 |
| Coapur ® 6050 (PU thickener) (Coatex) | 1.6 | 1.6 |
| PEG 200 (polyethylene glycol) | 2.83 | 2.83 |
| Total | 100 | 100 |

In order to prepare each of these pigment concentrates, the pigment was milled in a 1.5 mm diameter ball mill, with the water, primary dispersant, neutralizing agent and antifoaming agent at 1000 rpm for 1 h 30 min. The size of the particles is controlled using a North gauge and set at 20 μm.

The biocide, the PEG 200 drying retarder and the thickener are added at the end of the milling time. The concentrates were compared by their Brookfield viscosity (spindle No. 2) at 50 and 100 rpm after a rest time of 24 hours for each formulation. Results are presented in table 2 below:

TABLE 2

| | Brookfield viscosity (cP) | |
|---|---|---|
| | 50 rpm | 100 rpm |
| PCam | 47 | 45 |
| PCu | 154 | 118 |

This example shows that a pigment concentrate comprising an associative neutralizer according to the invention has a viscosity, for a given shear, greater than that of a pigment concentrate prepared with AMP® 95.

Moreover, heavy sedimentation appears in PCam from 48 hours onwards, which requires, at the end of one week, a mechanical redispersion. On the other hand, PCu displays only a very slight sedimentation at the end of one week of storage, and the redispersion is easily carried out by hand.

Example 2

White Aqueous Satin-Finish Bases, of Type SP1

Two white bases WBu and WBam are prepared by mixing the various constituents presented in table 2 below, in the proportions indicated (by weight), according to techniques known to the person skilled in the art for the formulation of latices.

Firstly the water, antifoaming agent, dispersant, neutralizing agent and antibacterial agent are mixed at 500 rpm using a disperser for 5 minutes. The mixture obtained is fluid.

The "pasting" (step in which the fillers are introduced) is then carried out, by introducing into the mixture obtained previously the pigments and rheology modifiers and sheen modifiers (titanium dioxide, calcium carbonate and talc) under stirring at 800 rpm, for 20 minutes. The introduction of the fillers is carried out slowly, and a heating of the mixture is often observed due to the shear forces.

The stirring is then reduced to 500 rpm in order to add the resin and the coalescing agent. The viscosity is then optionally controlled by addition of a thickener (PU, cellulose or polyether/polyol type).

TABLE 2

Preparation of white bases, of SP1 type: WBu and WBam

| | White base for interior satin-finish paint | WBu | WBam |
|---|---|---|---|
| 5 minutes at 500 rpm | Water | 90.6 | 90.6 |
| | Tego ® 7447 (antifoaming agent) | 2.3 | 2.3 |
| | COATEX P 90 (dispersant) | 2.8 | 2.8 |
| | UDETA (amine) | 2.8 | — |
| | AMP ® 90 | — | 2.8 |
| | Acticide MBS (biocide) | 1.1 | 1.1 |
| 20 minutes at 800 rpm | R-HD2 (titanium oxide) | 283 | 283 |
| | MIKHART 2 (calcium carbonate) | 79.2 | 79.2 |
| 5 minutes at 500 rpm | Craymul ® 2421 (Cray Valley) (aqueous dispersion of styrene/acrylic copolymer) | 501.8 | 501.8 |
| | Texanol ® (coalescing solvent) | 17 | 17 |
| | Rheolate ® 310 (50%) (polyether/polyol-based thickener) | 1.9 | 1.9 |
| | Water | 17.5 | 17.5 |
| | Total | 1000 | 1000 |

The white bases above were compared according to their initial pH and their initial viscosity (after a rest period of 24 hours after formulation) and their change in pH and viscosity on storage at ambient conditions for several months. The Brookfield viscosities were measured with a spindle No. 6, at 10 and 100 rpm.

The results are presented in table 3 below.

TABLE 3

Storage stability of the white bases at ambient temperature

| | WBu | | WBam | |
|---|---|---|---|---|
| | Initial value | After 7 months | Initial value | After 7 months |
| PH: | 8.62 +/− 0.3 | 8.53 | 8.91 +/− 0.3 | 8.64 |
| Viscosity (cP): | | | | |
| at 10 rpm: | 12700 | 18500 | 7700 | 9900 |
| at 100 rpm: | 4020 | 4930 | 2420 | 3140 |
| Observations: | Creamy paint | Good stability, creamy paint | Fluid paint | Syneresis |

The measurements of pH and of viscosity (Brookfield, spindle No. 6, 10 and 100 rpm, ambient temperature) are made at least 24 h after formulation, it being possible for the thickener to still act for some time after the end of the formulation. The pH values are equivalent for the two formulations, and are between 8.6 and 8.9.

After storage (7 months at ambient conditions), the pH has barely decreased for each of the formulations, however the paint formulated with AMP exhibits great syneresis (no storage stability).

On the contrary, the formulation neutralized using an associative neutralizing agent according to the invention (UDETA) exhibits both an excellent stability over time and also a high viscosity, thus confirming the rheology modifying property of the neutralizers of the present invention.

This example again shows the large difference in viscosity observed depending on the use of a conventional neutralizing agent or of an associative neutralizing agent according to the invention: an associative neutralizing agent according to the invention results in a higher viscosity of the freshly formulated paint relative to a paint neutralized using a conventional neutralizing agent.

After storing for 7 months at ambient temperature, this difference in viscosity remains. Furthermore, the white paint formulated with an associative neutralizer of the invention remains creamy on opening the pot after storing for 7 months, whereas the paint neutralized using a conventional neutralizer exhibits significant syneresis which requires a mechanical redispersion (viscosity measured after redispersion).

Example 3

Water Uptake Test

The white paints WBu and WBam described above were applied as a film of 100 μm to a glass plate and left to dry for 48 hours. Next, 20 drops of water (of around 50 μl each) are deposited in the middle of each surface painted with WBu and WBam.

A Petri dish or a watch glass with a diameter of 5 cm is then placed over the thus moistened zone so that the dish or watch glass forms a cover. The test consists in observing and counting the blisters resulting from the water uptake as a function of time, with an observation using a magnifying glass through the glass cover every 5 minutes.

The water uptake results with WBu and WBam are collated in table 4 below:

TABLE 4

Water uptake tests

| White base | WBu | WBam |
|---|---|---|
| Blistering | Small blisters at the end of 5 h 30 min; after 7 hours, 20% of the surface under the cover is blistered. | Small blisters at the end of 1 h 45 min; after 7 hours, 90% of the surface under the cover is blistered. |

This example illustrates the hydrophobic nature that the associative neutralizing agent of the invention gives to the white base, relative to a conventional neutralizing agent.

Example 4

"Blocking" Test

In order to evaluate the possible plasticization after drying of a film of paint neutralized according to the invention, which plasticization could result from a long residence time of the associative neutralizer according to the invention in the film, due to its high boiling point, a test known as a blocking test, similar to the ASTM D 4946 method, was carried out, as a comparison, on WBu and WBam.

The paints (WBu or WBam white base) described previously are applied with a thickness of 100 μm to two Leneta® contrast cards. After drying for 48 hours at ambient temperature the two cards are placed with their painted faces against one another. Superposed on the assembly is a glass plate, on which a weight of one kilogram is placed.

The assembly is left to dry for 24 hours before removing the weight and the glass plate. The two Leneta® cards are carefully separated, by hand. The test consists in visually observing the areas of detachment of the film deposited on each of the cards.

It is observed that the associative neutralizer according to the invention used in the WBu white base does not generate more zones of detachment than the reference neutralizer (AMP® 90). This indicates that the associative neutralizer according to the invention, although having a high boiling point (above 300° C.), does not exhibit a greater plasticizing nature than the reference neutralizers which are considered to be VOCs (boiling point of AMP®: around 165° C.)

Example 5

Persoz Hardness Test

It is known that a plasticization of a dried paint film also results in a lower hardness than for the paint which has not had the agent responsible for this plasticization added thereto. Consequently, a measurement of the Persoz hardness according to the BS3900:e5:1973, DIN 53157 and ISO 152 standard may be carried out in order to verify the absence of significant plasticization when an associative neutralizer according to the invention is incorporated into a paint.

A Persoz hardness test was carried out according to the aforementioned standard on dried films of WBu and WBam white bases. It is observed that the Persoz hardness of the film of paint made with the associative neutralizer according to the invention is of the same order of magnitude (i.e. a Persoz hardness of around 78) as that obtained with the reference neutralizer AMP®.

This also confirms the non-plasticizing nature of the neutralizer according to the invention.

Example 6

Co-Dispersant Effect on a Pigment Concentrate

A powder of an amphiphilic copolymer based on styrene, α-methylstyrene and acrylic acid such as Joncryl 678® sold by BASF is dispersed in a beaker with magnetic stirring, at 10% by weight in demineralized water. The neutralizing agent aminoethylimidazolidone (UDETA) having a purity of 95% by weight is first diluted to 20% by weight in water and added slowly (dropwise) to the beaker. The pH of the dispersion is monitored using a WTW brand pH meter with the reference pH 538 and a glass electrode. The neutralization is considered to be completed when the dispersion becomes a stable transparent or translucent solution on stopping the stirring and when the pH no longer changes and lies at a value between 8.5 and 10.5. By way of reference, a solution of the same copolymer is prepared in the same way by neutralizing the dispersion of the polymer at 10% in demineralized water via a gradual addition of a solution of sodium hydroxide at 10% by weight. In this case, the neutralization is considered to be completed when the dispersion becomes a stable transparent or translucent solution on stopping the stirring and when the pH no longer changes and reaches a value greater than 11.

A pigment concentrate is prepared using this dispersant neutralized by the associative neutralizing agent and also by the same dispersant neutralized by sodium hydroxide. In a plastic container (1 kg polypropylene bucket), 130.74 g of demineralized water, 0.74 g of a Sellig S4® antifoaming agent sold by CECA and 8.52 g of the preparation of dispersant neutralized with UDETA are mixed. Using a turbine mixer sold by Rayneri, the stirring at a speed of 300 rpm is started and 60 g of Irgalite Blue PG® pigment sold by CIBA are slowly added. During the addition of the pigment, the stirring is gradually increased to 800 rpm, the final speed at the time when all of the pigment has been added. The stirring is continued for 15 minutes and then the pigment concentrate is left at rest. In a similar manner, a concentrate is prepared with 128.43 g of demineralized water, 0.74 g of Sellig 54®, 10.83 g of the preparation of dispersant neutralized with UDETA and 60 g of Irgalite Blue PG pigment.

The pigment concentrates are observed after a minimum time of 24 hours after being left at rest. After 24 hours, the concentrate of the dispersant with UDETA has the appearance of a yogurt and can be easily redispersed by resumption of moderate stirring, including that obtained by hand using a spatula. The concentrate neutralized with sodium hydroxide has a large deposit at the bottom of the bucket that is more difficult to disperse.

The invention claimed is:
1. A method of neutralizing a paint comprising at least the steps of:
adding at least one associative neutralizing agent to a formulation, wherein the associative neutralizing agent, and wherein the formulation is a paint;
wherein adding the at least one associate neutralizing agent adjust the pH of the paint to a value of 8 or greater, and wherein the associative neutralizing agent is selected from 1-(2-aminoethy)imidazolidin-2-one (UDETA), 1-(2-[(2-aminoethyl)amino]ethyl) imidazolidone (UTETA), 1-(2-{2-[(2-aminoethylamino]ethyl}amino)ethyl]imi- dazolidone (UTEPA), N-(6-aminohexyl)-N'-(6-methyl-4-oxo-1,4-dihydropyrimidin-2yl)urea (UPy), or mixtures thereof.

2. The method of claim 1, wherein the mixture is selected from a white paint base, or a pigment concentrate.

3. The method of claim 1, wherein the associative neutralizing agent has at least one of the following features:
   1) $pK_a$ greater than or equal to 8.5 and not exceeding 12;
   2) soluble in proportions ranging from 10 g to 1000 g of the associative neutralizing agent per 100 g of polar solvent or water; or
   3) boiling point above 250° C. at atmospheric pressure.

4. The method of claim 1, wherein the associative neutralizing agent is UDETA.

5. The method of claim 1, wherein the paint is an aqueous or solvent-based pigmented paint.

6. The method of claim 1, wherein the paint is a pigmented paint having one or more pigments that are introduced into the paint by mixing a pigment concentrate and a white paint base, wherein the pigment concentrate comprises one or more pigments, at least one dispersant and water.

7. The method of claim 1, wherein the at least one associative neutralizing agent also serves as a thickener.

8. The method of claim 1, wherein the at least one associative neutralizing agent also serves as a codispersant.

* * * * *